(12) United States Patent
Mueller et al.

(10) Patent No.: US 8,949,430 B2
(45) Date of Patent: Feb. 3, 2015

(54) CLUSTERED COMPUTER ENVIRONMENT PARTITION RESOLUTION

(75) Inventors: Markus Mueller, Eutingen (DE); Steve Raspudic, Mississauga (CA)

(73) Assignee: International Business Machines Corporation, Armonk, NY (US)

( * ) Notice: Subject to any disclaimer, the term of this patent is extended or adjusted under 35 U.S.C. 154(b) by 482 days.

(21) Appl. No.: 13/434,413

(22) Filed: Mar. 29, 2012

(65) Prior Publication Data

US 2012/0239814 A1    Sep. 20, 2012

Related U.S. Application Data

(63) Continuation of application No. 13/051,040, filed on Mar. 15, 2011, now abandoned.

(51) Int. Cl.
*G06F 15/173* (2006.01)
*G06F 15/167* (2006.01)

(52) U.S. Cl.
USPC .......................... 709/226; 709/212; 709/216

(58) Field of Classification Search
None
See application file for complete search history.

(56) References Cited

U.S. PATENT DOCUMENTS

| | | | |
|---|---|---|---|
| 5,991,518 A * | 11/1999 | Jardine et al. | 714/4.5 |
| 6,363,495 B1 | 3/2002 | MacKenzie et al. | |
| 7,631,066 B1 | 12/2009 | Schatz et al. | |
| 7,734,960 B2 | 6/2010 | Mandal | |
| 7,739,541 B1 | 6/2010 | Rao et al. | |
| 7,739,677 B1 | 6/2010 | Kekre et al. | |
| 7,967,215 B2 * | 6/2011 | Kumar et al. | 235/492 |
| 2005/0083834 A1 | 4/2005 | Dunagan et al. | |
| 2008/0320113 A1 | 12/2008 | Arendt et al. | |

OTHER PUBLICATIONS

Kennard, Linda; Uptime in Real Time with NetWare Cluster Services for NetWare 5; Novell Connection Magazine; Sep. 1, 1999.
Agarwal, D. A., et al.; A Reliable Ordered Delivery Protocol for Interconnected Local-Area Networks; IEEE; 1995; pp. 365-374.

* cited by examiner

*Primary Examiner* — John B. Walsh
(74) *Attorney, Agent, or Firm* — James L. Baudino

(57) ABSTRACT

According to one aspect of the present disclosure, a method and technique for clustered computer environment partition resolution is disclosed. For a clustered environment having a plurality of nodes, the method includes: creating a key by a first node of the plurality of clustered nodes, the plurality of clustered nodes each configured to have access to a storage provider resource; communicating the key to remaining nodes of the plurality of clustered nodes; responsive to detecting a potential partition event, generating by at least one of the plurality of clustered nodes a lock code using the key for reserving the storage provider resource; and responsive to determining an unlocked status of the storage provider resource, resolving the partition event by writing the lock code to the storage provider resource.

22 Claims, 5 Drawing Sheets

CLUSTERED COMPUTER ENVIRONMENT PARTITION RESOLUTION

BACKGROUND

Distributed computer systems have the capability of sharing resources. "Clustering" generally refers to a computer system organization where multiple computing platforms, or nodes, are networked together to cooperatively perform computer tasks. The cluster typically provides rapid communication between nodes, such as over a local area network or other type of communication interconnection. The cluster also typically includes a shared storage device or resource accessible by the clustered nodes.

Operation of a cluster generally requires coordination among the nodes, including cluster partitioning. Cluster partitioning may result if a network communication failure occurs such that one or more of the nodes cannot communicate with other nodes of the cluster. Generally, resources hosted on a node that has lost communication with other nodes are terminated to ensure that the resources are being run on only one node in the cluster. Otherwise, a condition known as split-brain operation may occur where multiple nodes may decide that is proper to control a resource which should be controlled by one node at a time.

BRIEF SUMMARY

According to one aspect of the present disclosure a method and technique for clustered computer environment partition resolution is disclosed. For a clustered environment having a plurality of nodes, the method includes: creating a key by a first node of the plurality of clustered nodes, the plurality of clustered nodes each configured to have access to a storage provider resource; communicating the key to remaining nodes of the plurality of clustered nodes; responsive to detecting a potential partition event, generating by at least one of the plurality of clustered nodes a lock code using the key for reserving the storage provider resource; and responsive to determining an unlocked status of the storage provider resource, resolving the partition event by writing the lock code to the storage provider resource.

BRIEF DESCRIPTION OF THE SEVERAL VIEWS OF THE DRAWINGS

For a more complete understanding of the present application, the objects and advantages thereof, reference is now made to the following descriptions taken in conjunction with the accompanying drawings, in which.

DETAILED DESCRIPTION

Figure 1:
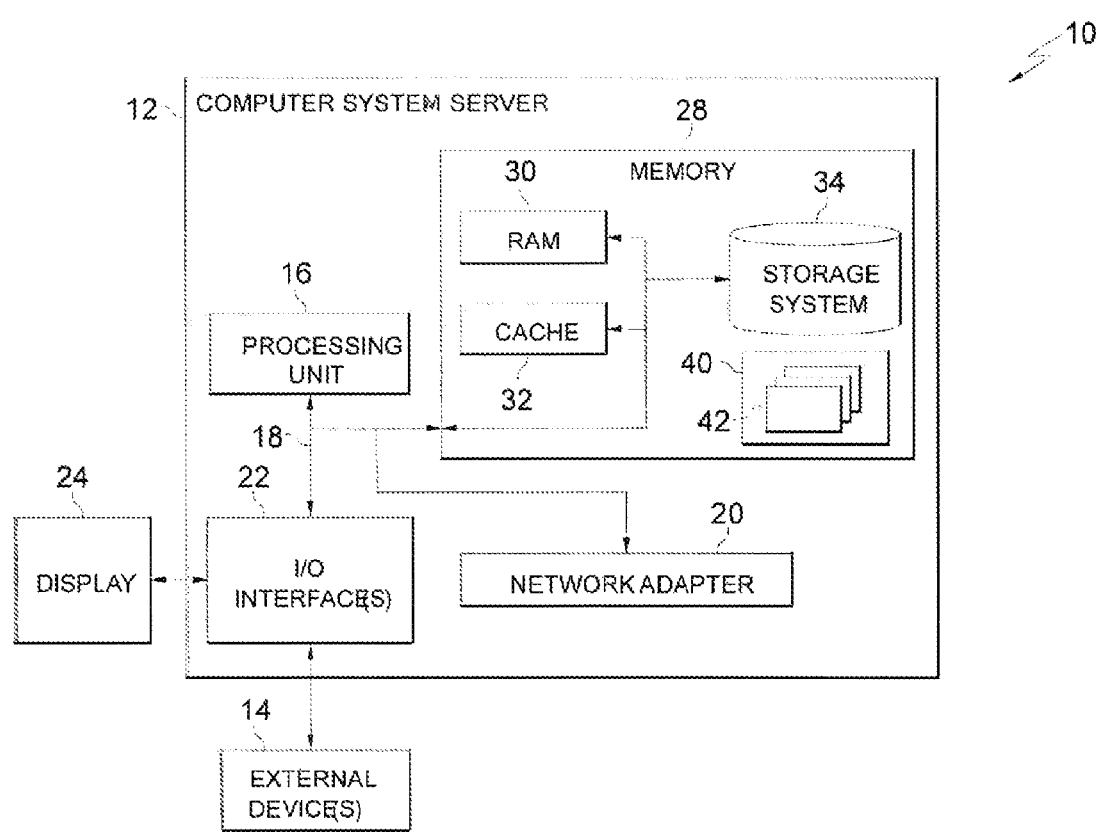
FIG. 1 depicts a cloud computing node according to an embodiment of the present invention.

Embodiments of the present disclosure provide a method, system and computer program product for clustered computer environment partition resolution. For example, in some embodiments, the method and technique for a clustered environment having a plurality of nodes includes: creating a key by a first node of the plurality of clustered nodes, the plurality of clustered nodes each configured to have access to a storage provider resource; communicating the key to remaining nodes of the plurality of clustered nodes; responsive to detecting a potential partition event, generating by at least one of the plurality of clustered nodes a lock code using the key for reserving the storage provider resource; and responsive to determining an unlocked status of the storage provider resource, resolving the partition event by writing the lock code to the storage provider resource. Embodiments of the present disclosure enable a third party storage resource, such as a cloud storage resource connected to the nodes of the cluster over the Internet, to be used to resolve a network partition event. For example, responsive to detecting a network partition event, the shared key is used to reserve the shared storage resource by one of the nodes.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer usable or computer readable medium(s) may be utilized. The computer readable medium may be a computer readable signal medium or a computer readable storage medium. A computer readable storage medium may be, for example but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with and instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure is described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
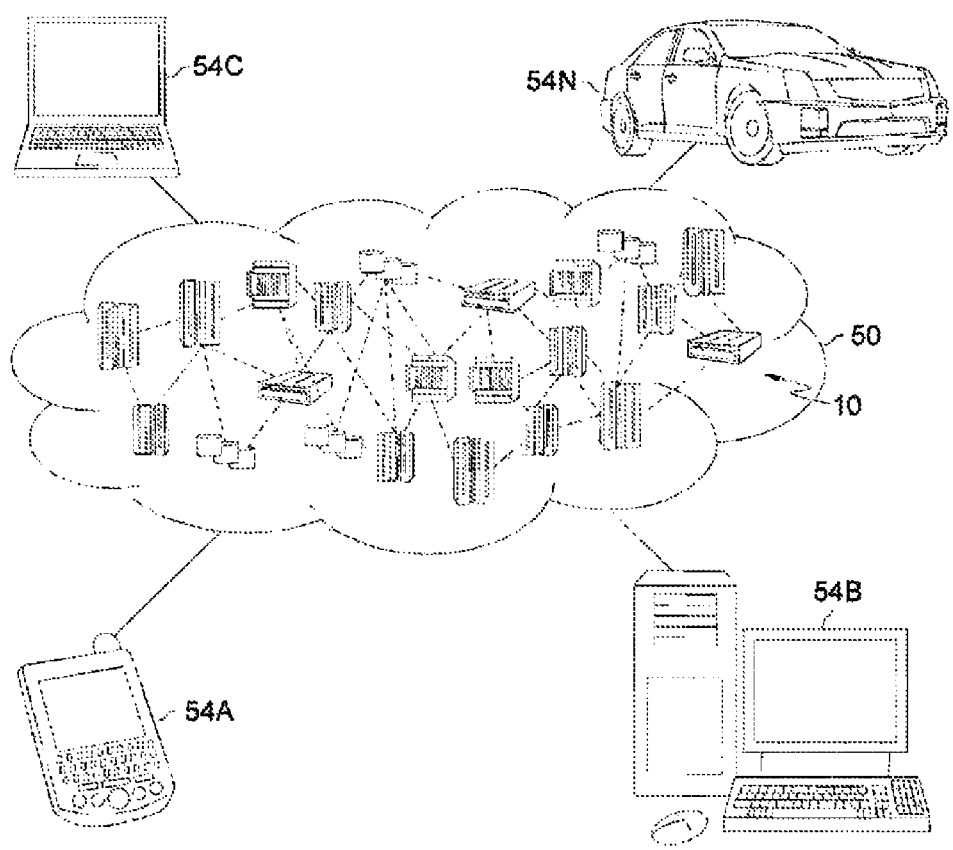
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
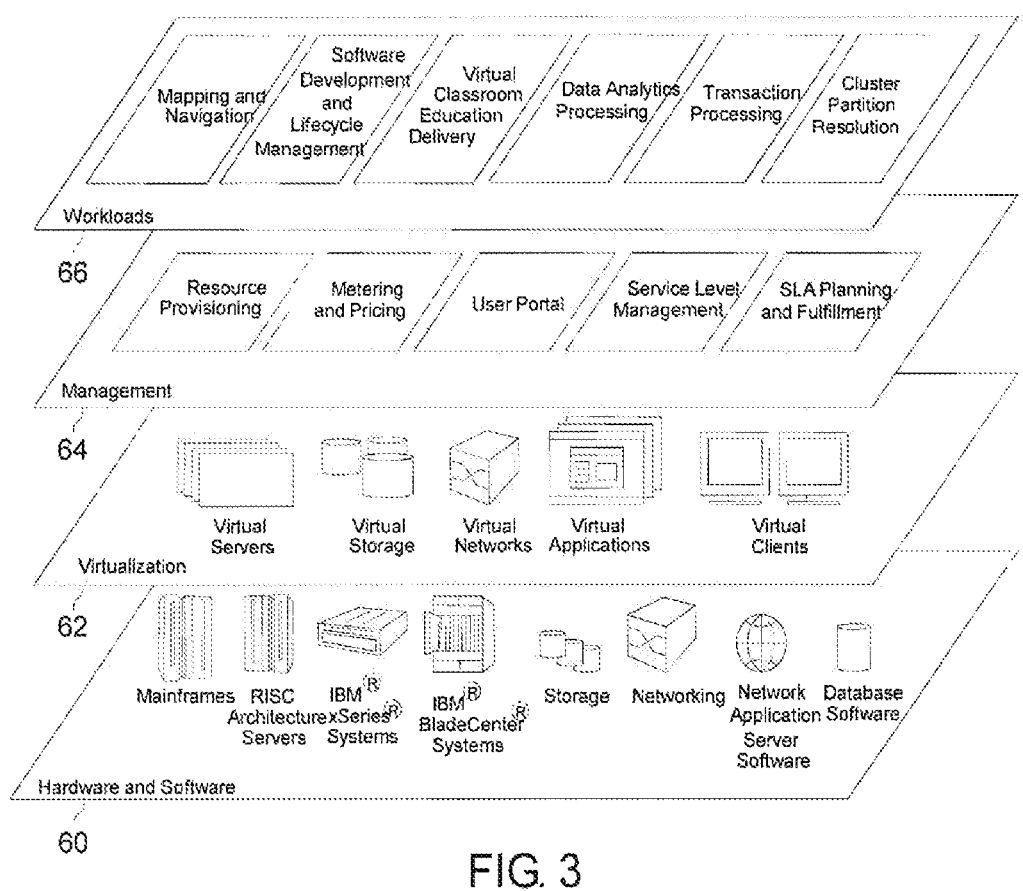
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and cluster partition resolution.

Figure 4:
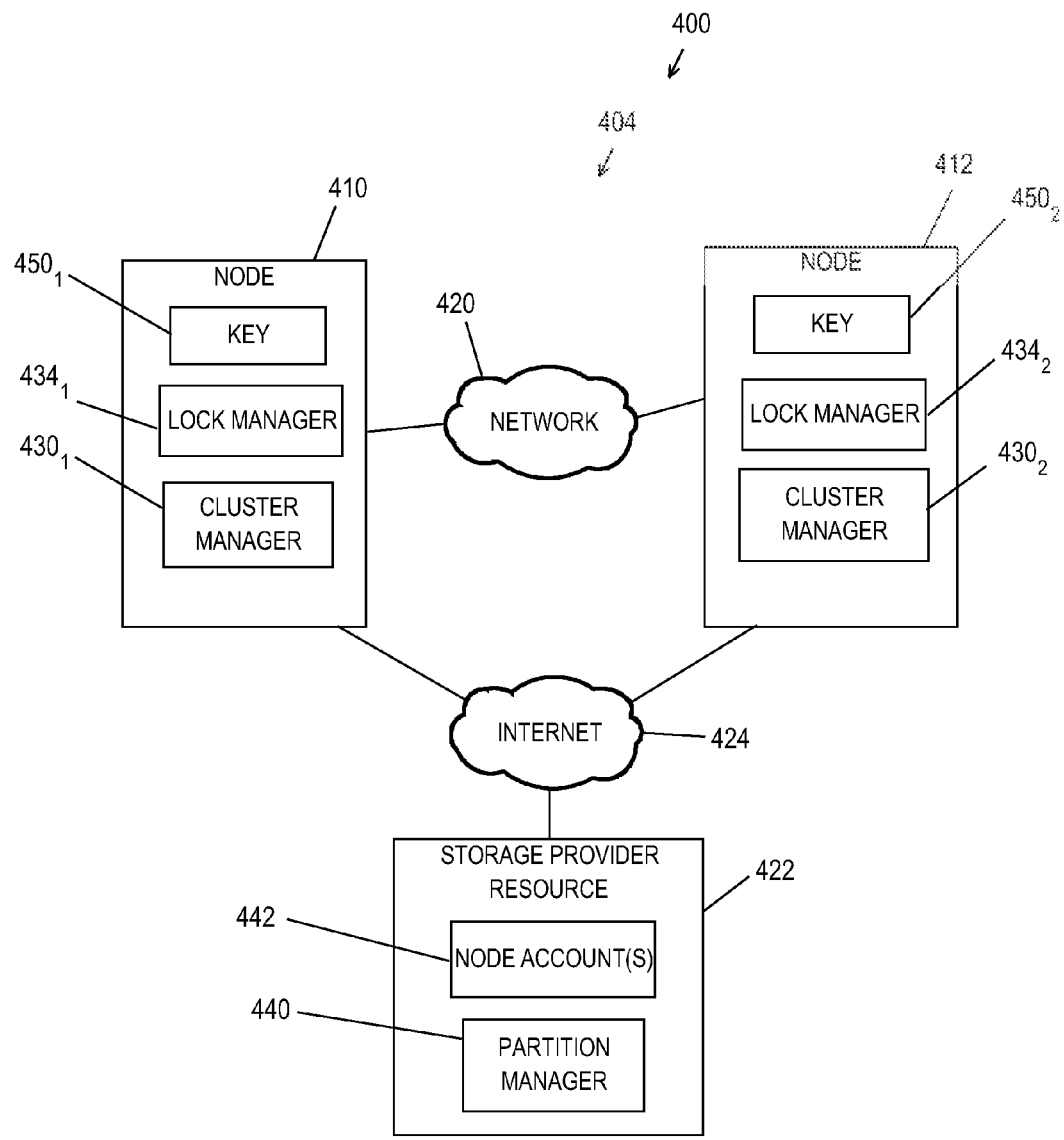
FIG. 4 depicts an embodiment of a data processing system in which illustrative embodiments of a clustered computer environment partition resolution system may be implemented.

FIG. 4 is an illustrative embodiment of a system 400 for clustered computer environment partition resolution. System 400 may be implemented on data processing systems or platforms such as, but not limited to, node 10 or at other data processing system locations. In the embodiment illustrated in FIG. 4, system 400 comprises a clustered network environment 404 including nodes 410 and 412 connectable to each other via a network 420. Any number of network topologies may be used for network 420 such as, but not limited to, a high speed point-to-point bus, a LAN, a WAN, and combinations thereof. Nodes 410 and 412 may be physically located in close proximity to each other or remotely located. Nodes 410 and 412 may comprise servers, workstations, or other types of computing platforms (e.g., such as node 10 as depicted in FIG. 1) and may be further connected to a shared storage device or storage area network (SAN). Nodes 410 and 412 are also connectable to a storage provider resource 422 provisioned as a cloud resource. For example, in some embodiments, resource 422 may be accessed over a public network 424 such as the Internet. In some embodiments, resource 422 may be hosted by a third party (a party other than a party controlling and/or operating nodes 410 and 412). Resource 422 may be implemented on data processing systems or platforms such as, but not limited to, node 10. Thus, resource 422 may take the form of a general-purpose computing device having one or more processors or processing units, memory, disk storage, etc. In the embodiment of FIG. 4, two nodes are illustrated; however, it should be understood that a greater quantity of nodes may be clustered in the clustered network environment. Further, it should be understood that a greater quantity of shared storage resources may be provided.

In the embodiment illustrated in FIG. 4, nodes 410 and 412 each respectively include a cluster manager $430_{1-2}$ and a lock manager $434_{1-2}$. In FIG. 4, resource 422 includes a partition manager 440. Cluster manager 430, lock manager 434 and partition manager 440 may comprise software, logic and/or executable code for performing various functions as described herein (e.g., residing as software and/or an algorithm running on a processor unit, hardware logic residing in a processor or other type of logic chip, centralized in a single integrated circuit or distributed among different chips in a data processing system). For example, cluster manager 430 is configured to perform various cluster processes such as, but not limited to, initiating and/or creating a cluster. Cluster manager 430 may be used to initiate a cluster and transmit requests and/or status information to other nodes for joining the cluster, generating cluster configuration information (e.g., the quantity and identification of nodes in the cluster, the heartbeat frequency for communicating a sequence of messages indicating to a receiver node that a sender node is operational, etc.), and/or for performing other processes related to the created cluster. In some embodiments, cluster manager 430 secures and/or otherwise provisions accounts 442 with resource 422 for each node of the cluster. For example, each account 442 may enable the corresponding node to access resource 422 for various operations such as, but not limited to, reading and/or writing data to disk space and/or utilizing other resources of storage provider resource 422. It should be understood that in some embodiments, accounts with resource 422 for each node of the cluster may be created independently (e.g., by a system administrator or by a resource other than node 410 or 412). In some embodiments, cluster manager 430 may access and/or periodically communicate with resource 422 to validate availability of resource 422.

In some embodiments, in response to cluster creation, cluster manager 430 generates a unique key related to the created cluster and shares/communicates the key to the other nodes of the cluster. For example, if the cluster was initiated by node 410, cluster manager $430_1$ may create and store an instance of key $450_1$ on node 410 and communicate the key to node 412, where node 412 stores its instance of the key $450_2$ thereon. It should be understood that either of nodes 410 and 412 may create the cluster and/or initiate key generation.

Partition manager 440 is used to resolve a potential network partition event. For example, in some embodiments, state information and heartbeat messages are communicated between peer nodes at predefined intervals. Cluster manager 430 for each node monitors the communications to detect a loss of heartbeat message from a peer node. In response to detecting a loss of communications with another node, lock manager 434 is invoked to initiate a tie-breaking process to reserve network resources and continue operating as the primary or master node. As will be described below, lock manager 434 access resource 422 and writes information to resource 422 using key 450 to seize the cluster resources and establish the writing node as the winner of the tie-breaking process, thereby establishing the writing node as the primary or master node.

Lock manager 434 generates lock code for writing to resource 422 in response to a potential partition event. For example, in some embodiments, the lock code includes a value representative of key 450 such that a unique identifier is written to resource 422 (e.g., a unique namespace incorporating key 450 and/or a representative value of key 450). Lock manager 434 accesses resource 422 to attempt to write the lock code to resource 422. Partition manager 440 controls the process of writing the lock code to resource 422. For example, in response to a request to write the lock code to resource 422, partition manager 440 may determine a lock status indicating whether a tie-breaking process has already been completed. If one of the nodes has already written its lock code to resource 422, partition manager 440 may return a positive lock status indication, thereby preventing another node from writing its lock code to resource 422. In response to successfully writing the lock code to resource 422, the writing node thereby reserves resource 422 and controls network resources while continuing to operate as the primary or master node. If another node attempts to write the lock code to resource 422, partition module 440 prevents the subsequent node from writing the lock code (e.g., a file space already exists with the corresponding namespace), whereby the subsequent node discontinues operating and/or reboots no longer as part of the clustered network.

Thus, in operation, in response to detecting a loss of communications between nodes 410 and 412, each of nodes 410 and 412 may invoke its respective lock manager $434_{1-2}$ to invoke the tie-breaking process and attempt to declare itself as the primary node to avoid a split-brain operation. Each lock manager $434_{1-2}$ may attempt to access resource 422 and write its lock code to resource 422 based on the shared key 450. In operation, the first node to successfully write the lock code to resource 422 wins the tie-breaking process and continues operating as the primary or master node. In response to forming a new cluster, a new key 450 is generated and shared among nodes of the new cluster.

Figure 5:
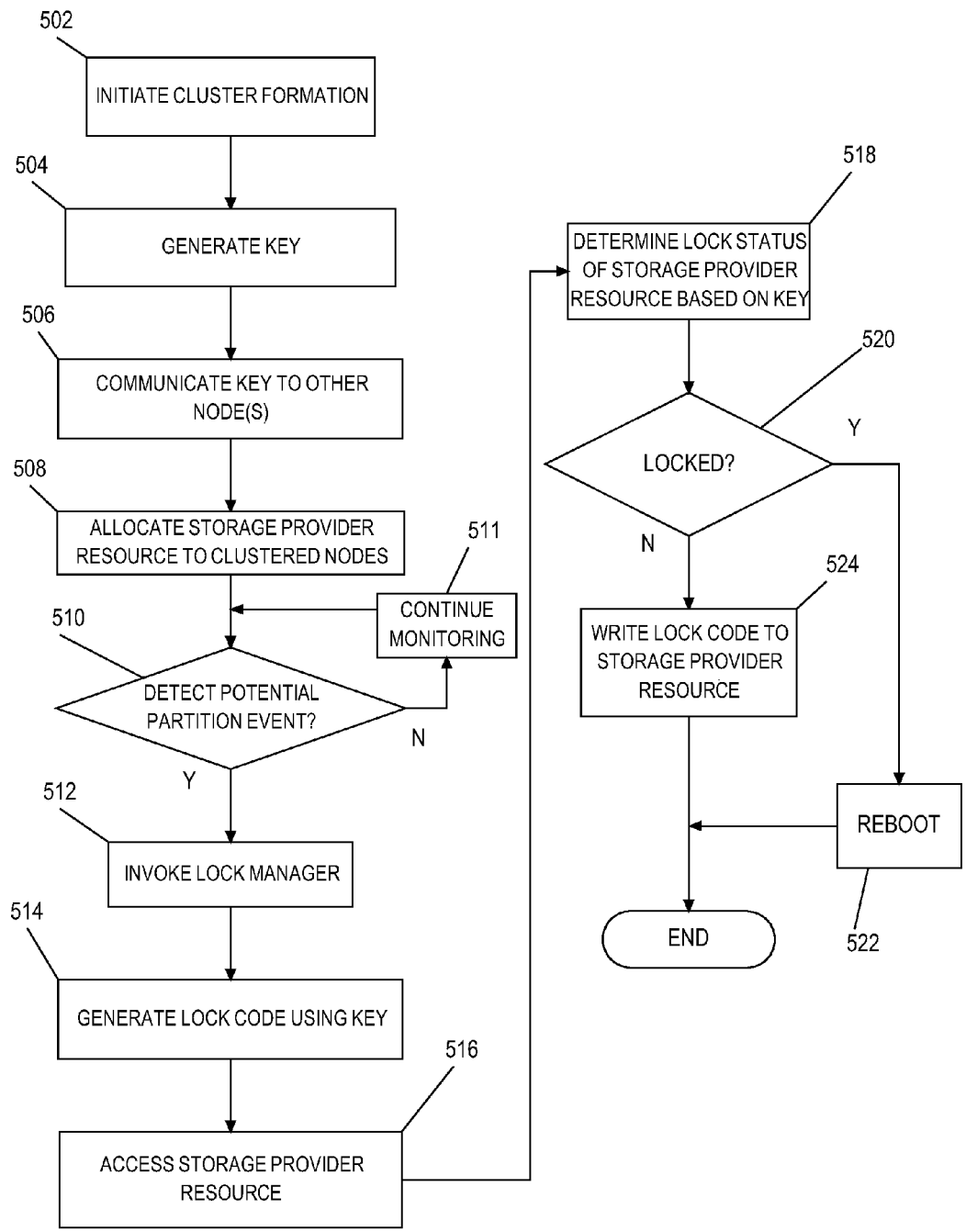
FIG. 5 depicts a flow diagram illustrating an embodiment of a clustered computer environment partition resolution method.

FIG. 5 is a flow diagram illustrating an embodiment of a method for clustered computer environment partition resolution. The method begins at block 502, where one of nodes 410 or 412 initiates a cluster formation. At block 504, the node creating the cluster generates a unique key 450, and at block 506, the creating node shares/communicates key 450 to remaining nodes in the cluster. At block 508, storage provider resource 422 is allocated to nodes of the cluster. For example, as described above, an account may be created for each node with resource 422 to enable each node of the cluster to interact with resource 422.

At decision block 510, a determination is made whether a potential network partition event has occurred. If a potential partition event has not been detected, the method proceeds to block 511, where nodes 410 and 412 continue monitoring for a potential partition event. If a potential partition event has been detected, the method proceeds from block 510 to block 512, where one or more of the nodes detecting the potential partition event invoke its lock manager 434. At block 514, lock manager 434 generates lock code using its instance of key 450. At block 516, lock manager 434 accesses resource 422 to attempt to write its lock code to resource 422.

At block 518, partition manager 440 determines the lock status of resource 422 based on key 450. For example, in response to receiving a write request from one of nodes 410 or 412 of its lock code each having been created based on shared key 450, partition manager 440 may determine that one of nodes 410 or 412 has already written its lock code to resource 422, thereby resulting in a positive lock status and a denial of the write request. If a positive lock status is returned, the method proceeds to block 522, where the node denied the ability to write its lock code to resource 422 shuts down and/or reboots, thereafter the method terminating for the indicated node. If permission is granted to write the lock code to resource 422, the method proceeds from block 420 to block 524, where the lock code is written to resource 422, thereby resulting in the writing node being notified that it continues operating as the primary or master node.

Thus, embodiments of the present disclosure enable network partition event resolution among a cluster of networked nodes without reliance on a shared storage device, especially if the nodes are spread over remote distances. Further, embodiments of the present disclosure enable network partition event resolution among a cluster of nodes utilizing a cloud resource as the means for preventing a split-brain operation among the nodes.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for a clustered environment having a plurality of nodes, the method comprising:
   creating a key by a first node of the plurality of clustered nodes, the plurality of clustered nodes each configured to have access to a storage provider resource;
   communicating the key to remaining nodes of the plurality of clustered nodes;
   responsive to detecting a potential partition event, generating by at least one of the plurality of clustered nodes a lock code using the key for reserving the storage provider resource; and
   responsive to determining an unlocked status of the storage provider resource, resolving the partition event by writing the lock code to the storage provider resource.

2. The method of claim 1, further comprising, responsive to creating the clustered environment by the first node, creating the key by the first node.

3. The method of claim 1, further comprising configuring each of the plurality of clustered nodes with an account with the storage provider resource.

4. The method of claim 1, further comprising, responsive to writing the lock code to the storage provider resource, permitting the node writing the lock code to the storage provider resource to continue.

5. The method of claim 1, further comprising provisioning the storage provider resource in a cloud environment.

6. The method of claim 2, further comprising provisioning, by the first node, the storage provider resource in a cloud environment.

7. The method of claim 1, further comprising:
   responsive to detecting the potential partition event, accessing the storage provider resource; and
   determining a lock status of the storage provider resource based on the key.

8. A method for a clustered environment having a plurality of nodes, the method comprising:
   responsive to detecting a potential network partition event, generating a lock code using a key shared among each of the plurality of nodes;
   accessing a storage provider resource;
   determining whether the lock code has been written to the storage provider resource;
   responsive to determining that the lock code has not been written to the storage provider resource, writing the lock code to the storage provider resource; and
   responsive to writing the lock code to the storage provider resource, continuing operations as a primary node of the clustered environment.

9. The method of claim 8, further comprising accessing the storage provider resource in a cloud environment.

10. The method of claim 8, further comprising:
    responsive to creating another clustered environment having a plurality of nodes, generating a revised key; and
    sharing the revised key among the plurality of nodes of the another clustered environment.

11. The method of claim 8, further comprising configuring each of the plurality of clustered nodes with an account with the storage provider resource.

12. The method of claim 8, further comprising periodically validating access to the storage provider resource.

13. A system comprising:
    a first node couplable to a second node in a clustered network environment; and
    a storage provider resource accessible by the first and second nodes; and
    wherein the first node comprises logic executable by a processor unit to:
      create a key;
      communicate the key to the second node;
      responsive to detecting a potential partition event, generate a lock code using the key for reserving the storage provider resource; and
      responsive to determining a negative lock status of the storage provider resource, resolve the partition event by writing the lock code to the storage provider resource.

14. The system of claim 13, wherein the first node is configured to, responsive to creating the clustered environment, create the key.

15. The system of claim 14, wherein the first node is configured to allocate to each of the first and second nodes an account with the storage provider resource.

16. The system of claim 13, wherein the first node is configured to provision the storage provider resource in a cloud environment.

17. The system of claim 16, wherein the first node is configured to:
    responsive to detecting the partition event, access the storage provider resource; and
    determine a lock status of the storage provider resource based on the key.

18. A computer program product for partition resolution in a clustered network environment having a plurality of nodes, the computer program product comprising:
    a non-transitory computer readable medium having computer readable program code embodied therewith, the computer readable program code comprising computer readable program code configured to:
      create a key by a first node of the plurality of clustered nodes, the plurality of clustered nodes each configured to have access to a storage provider resource;
      communicate the key to remaining nodes of the plurality of clustered nodes;
      responsive to detecting a potential partition event, generate a lock code using the key for reserving the storage provider resource; and
      responsive to determining a negative lock status of the storage provider resource, resolve the partition event by writing the lock code to the storage provider resource.

19. The computer program product of claim 18, wherein the computer readable program code is configured to, responsive to creating the clustered environment, create the key.

20. The computer program product of claim 18, wherein the computer readable program code is configured to provision each of the plurality of clustered nodes with an account with the storage provider resource.

21. The computer program product of claim 18, wherein the computer readable program code is configured to provision the storage provider resource in a cloud environment.

22. The computer program product of claim 18, wherein the computer readable program code is configured to:
- responsive to detecting the partition event, access the storage provider resource; and
- determine a lock status of the storage provider resource based on the key.

\* \* \* \* \*